March 12, 1929.  G. L. McCAIN  1,704,799
MOTOR VEHICLE
Filed April 26, 1920
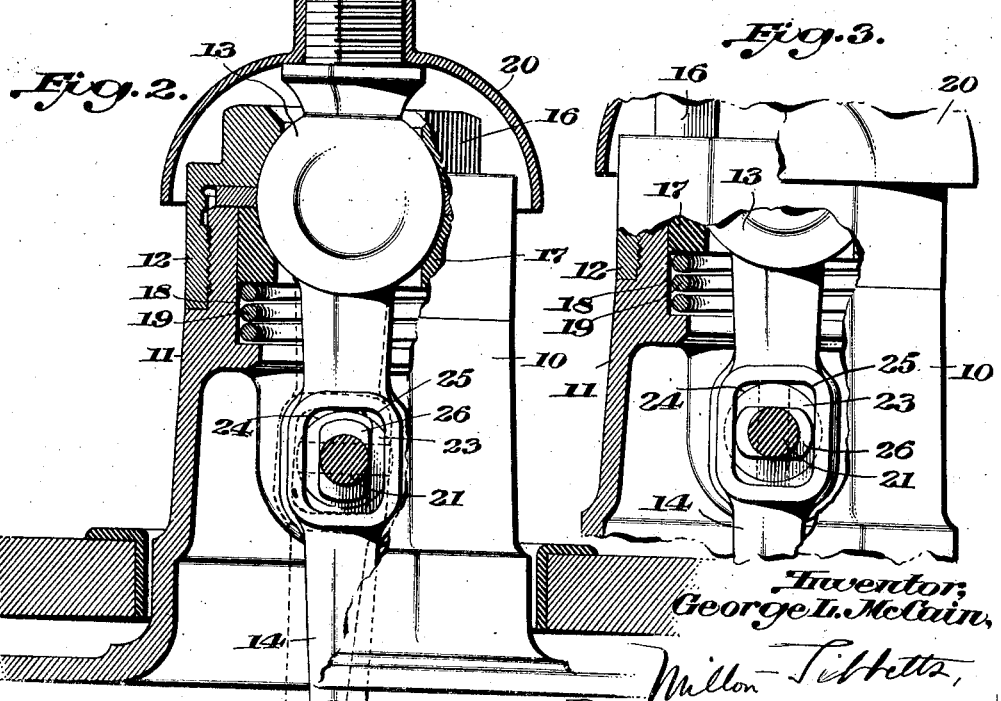
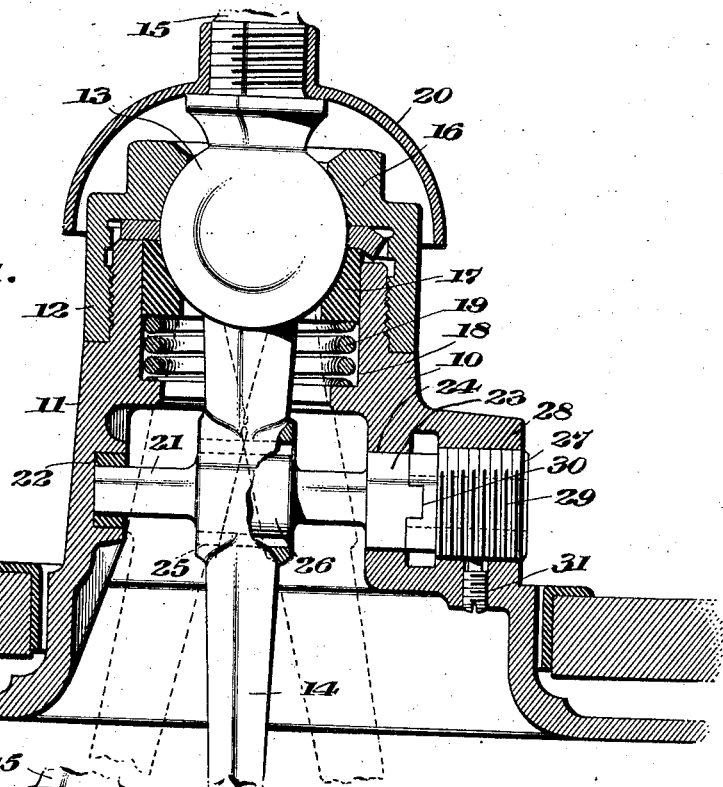
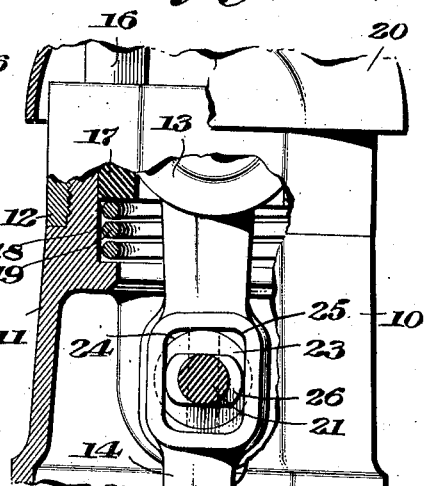
Inventor,
George L. McCain,
By Milton Tibbetts,
Atty.

Patented Mar. 12, 1929.

1,704,799

UNITED STATES PATENT OFFICE.

GEORGE L. McCAIN, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed April 26, 1920. Serial No. 376,849.

This invention relates to lever locking mechanism for preventing the operative movement of levers and is more particularly adapted for locking the control levers of motor vehicles.

The device which will be specifically described is designed particularly for use in connection with the type of lever adapted for lateral movement on its pivot for selective engagement with the shiftable elements and for movement at right angles to the line of selective movement for operating the shiftable elements to throw the transmission gearing into and out of mesh. The locking mechanism has for its function to retain the shifting lever in neutral position and to prevent the lateral movement of the lever on its fulcrum, thereby preventing the shifting of the transmission gears and in this way preventing the unauthorized use or theft of the motor vehicle.

The object of the invention is to provide a locking mechanism which is simple and strong in construction and will effectively lock the control lever against operative movement.

Further objects of the invention will appear from the specification taken in connection with the drawings which form a part thereof, and in which:

Fig. 1 shows the lever and locking mechanism in side elevation, the casing or lever mounting being shown in section.

Fig. 2 is a sectional view taken substantially at right angles to Fig. 1 but showing the lever in full lines in neutral position; and Fig. 3 is a fragmentary view of the lever and locking bolt showing the bolt in locking position.

The lever control mechanism is mounted in the bracket or casing, which may be secured in any suitable manner to the transmission case or housing for the transmission gearing and this bracket or casing is preferably made in two sections 11 and 12. In the embodiment of the invention illustrated, the upper section 12 forms a cap or cover for the casing and is threaded onto the upper portion of the lower section 11. The lever is formed with a spherical bearing portion 13, a downwardly extending arm 14, which is adapted to engage and operate the shiftable elements and an upwardly extending handle 15. The spherical portion 13 is seated in a pair of spherical bearings 16, 17, the bearing 16 being formed on the cap or cover 12 and the bearing 17 being slidably mounted in a recess 18 formed in the section 11 of the casing. The bearing member 17 is engaged by a spring 19 which is mounted in the recess 18 and forces the member 17 into engagement with the lower portion of the spherical bearing 13. A shield 20 is secured to the lower end of the handle 15 and covers the upper portion of the cap 12.

As above stated, the locking mechanism is adapted to retain the shifting lever in neutral position by preventing the lateral shifting of the lever on its fulcrum into selective engagement with the shiftable elements. This locking mechanism comprises a bolt 21, which is rotatably mounted at one end in a bushing 22 carried by the section 11 of the casing 10, and at its opposite end is enlarged as shown at 23, the enlarged portion being rotatably mounted in a bearing 24 formed in the opposite side of section 11 of the casing 10. The arm 14 of the lever is provided with a transversely extending opening or bore 25 through which the bolt extends, this bore being oblong in shape as illustrated in Fig. 2. The portion 26 of the bolt 21 which is disposed within the transverse bore of the arm 14 is also enlarged and made oblong in shape, the longer dimension of the bolt being substantially equal to or slightly less than the shorter dimension of the bore, and the longer dimension of the bore being greater than the longer dimension of the bolt for reasons hereinafter stated.

A suitable lock is provided for locking and unlocking the lever and in the embodiment of the invention illustrated this lock is mounted in a screw threaded plug 27 carried by the outwardly extending apertured boss 28, formed on the section 11 of the casing 10. A barrel 29 is rotatably mounted in the plug 27, and extends through the plug, engaging the outer end of the enlarged portion 23 of the bolt 21 shown at 30. It will be understood that the usual locking pins or tumblers engage the barrel 29, these tumblers being releasable by means of a key in a manner well known in the art. A set screw 31 engages and prevents the rotation of the plug 27.

The locking mechanism just described operates as follows:

In order to operate the gear shifting mechanism, it is necessary first to shift the lever laterally and then to shift the lever at right angles to the first direction of movement in order to move the shiftable elements. In order to lock the lever control and thereby prevent the lateral shifting of the lever from neutral position, a key is inserted in the barrel 29 and the lock bolt 21 is rotated to a position in which portion 26 of the bolt will be disposed crosswise of the oblong opening 25 formed in the lever arm 14. When the bolt has been rotated in this manner the ends of the enlarged portion of the bolt will prevent lateral movement of the lever, thereby preventing the movement of the lever from neutral position. When the operator desires to start the motor vehicle and to operate the transmission gearing, the bolt 21 is rotated at right angles to the position just described or to the position shown in Fig. 2. When the bolt is in this position the lever may be shifted laterally a sufficient distance to engage the shiftable elements of the transmission mechanism, thereby permitting the shifting of the gears and the operation of the vehicle. It will be understood that there is sufficient distance between the ends of the enlarged portion 26 of the bolt and the ends of the oblong bore formed on the lever arm 14 to permit the movement of this lever a sufficient distance to shift the gears in the manner desired when the lever has been shifted laterally into engagement with the shiftable elements. This shifted position of the lever is shown in dotted lines in Fig. 1.

From the above description it will be seen that I have provided a construction of locking mechanism for control levers which is simple and strong in construction, and comprises few parts, and moreover, a construction which will effectively lock the control lever against operative movement.

While one specific embodiment of the invention has been illustrated and described, it will be understood that the invention is not limited to the particular form of the invention shown but that changes in the construction and arrangement of the various parts may be made without departing from the spirit or scope of the invention as expressed in the following claims.

Having thus described my invention, what I claim and desire to secure by Letters Patent is:

1. Locking mechanism comprising in combination a casing, a lever fulcrumed therein and having a transverse bore located at one side of its fulcrum, a locking bolt rotatably mounted in said casing and extending through said bore, said bore being oblong in shape, and said bolt having an enlarged oblong portion disposed in said bore, one dimension of the oblong portion of said bolt being substantially equal to one dimension of the transverse bore in said lever.

2. Locking mechanism comprising in combination a casing, a lever fulcrumed therein, and having a transverse bore oblong in shape, a locking bolt rotatably mounted in said casing and extending through said bore, said bolt having an oblong portion disposed in the bore of the said lever, one dimension of the oblong portion of the said bolt being substantially equal to one dimension of the oblong bore of the said lever and being less than the other dimension of the oblong bore in the lever.

3. Locking mechanism comprising, in combination, a casing, a lever fulcrumed therein for oscillatory movement in two planes and having a transverse opening extending through it located at one side of the fulcrum, a locking bolt mounted in said casing and extending through said opening and co-operating therewith to lock the lever against movement in one plane when the bolt is in one position and to permit free movement of the lever when the bolt is in another position, and rotatable means engaging the bolt for moving it from one of said positions to the other.

4. Locking mechanism comprising, in combination, a casing, a lever fulcrumed therein and having a transverse opening extending through it, a locking bolt mounted in said casing and extending through said opening, said bolt and opening so co-operating that rotation of the bolt will center and lock the lever, and rotatable means engaging the bolt for moving it from one position to another.

5. A locking mechanism comprising, in combination, a lever having a non-circular bore located at one side of its fulcrum and a rotatable non-circular member positioned in the bore.

6. A locking mechanism comprising, in combination, a casing, a lever fulcrumed therein for oscillatory movement in two planes and provided with a transverse non-circular bore located at one side of its fulcrum and a rotatable member having a non-circular portion positioned in the bore for locking the lever against movement in one plane.

7. A locking mechanism comprising, in combination, a bracket, a lever fulcrumed therein for oscillatory movement in a plurality of planes and provided at one side of its fulcrum with a transverse non-circular bore and a rotatable member extending through said bore having a non-circular portion adapted for cooperation with the non-circular bore for locking said lever against movement in one of the planes.

8. A locking mechanism comprising, in combination, a casing, a lever fulcrumed therein for oscillatory movement in two planes at right angles with respect to each other and provided at one side of its fulcrum with a transverse rectangular bore, a rotatable lock bolt mounted in the casing and extending through the bore, a rectangular portion on the lock bolt adapted for cooperation with the rectangular bore in the lever and means for rotating the lock bolt for engaging and disengaging the respective ends of the rectangular portion with the sides of the rectangular bore to lock and unlock the lever against movement in one of the planes.

In testimony whereof I affix my signature.

GEORGE L. McCAIN.